of the curtains and therefore the irradiation area of the object wherein optical means are connected with the curtains for concentrating the light incident upon the optical means from the light source to a line pattern of high intensity defining the extent of the irradiation area on the object.

United States Patent [19]
Edholm et al.

[11] 3,921,001
[45] *Nov. 18, 1975

[54] SCREENING OR APERTURE DEVICE FOR AN X-RAY APPARATUS

[75] Inventors: Paul Ragnvald Edholm, Linkoping; Nils Bertil Jacobson, Solna, both of Sweden

[73] Assignee: Medinova AB of Sweden, Solna, Sweden

[*] Notice: The portion of the term of this patent subsequent to Feb. 13, 1990, has been disclaimed.

[22] Filed: Aug. 14, 1973

[21] Appl. No.: 388,239

[30] Foreign Application Priority Data
Aug. 21, 1972 Sweden............................ 10836/72
Nov. 29, 1972 Sweden............................ 15535/72

[52] U.S. Cl................................ 250/510; 250/505
[51] Int. Cl.² ......................................... H01J 5/16
[58] Field of Search .......... 250/320, 322, 323, 491, 250/493, 503, 505, 510, 511, 512, 513, 514, 515, 520, 522, 523

[56] References Cited
UNITED STATES PATENTS
2,474,422  6/1949  Hollstein ............................ 250/512
2,614,224  10/1952  Wright ................................ 250/491
2,747,105  5/1956  Fitzgerald et al. .................. 250/510
3,717,768  2/1973  Edholm et al. ..................... 250/510

Primary Examiner—James W. Lawrence
Assistant Examiner—B. C. Anderson
Attorney, Agent, or Firm—Albert L. Jeffers; Roger M. Rickert

[57] ABSTRACT

A device for visibly detecting an area to be exposed to an X-ray beam is disclosed comprising curtains displaceable in relation to each other for defining an aperture for screening an X-ray beam to a desired irradiation area of an object and a light source adapted to transmit a light beam against the curtains for creating on the object a light pattern indicative of the position 7 Claims, 7 Drawing Figures

SCREENING OR APERTURE DEVICE FOR AN X-RAY APPARATUS

BACKGROUND OF THE INVENTION

The present invention relates to a screening or aperture device for an X-ray apparatus.

When an object is to be X-ray photographed it is necessary to direct and screen the X-ray beam so that only the desired portion of the object is reproduced. In order to direct and screen the X-ray beam there is used an aperture screen or plate. This comprises a number of, usually four, X-ray absorbing curtains which are movable in relation to each other and define an aperture allowing the desired area of the beam to pass. When the size of the aperture is varied, the size of the area of the object which is reproduced also varies. To be able to locate on the object the area which is to be irradiated during the photographing the aperture screen or plate comprises a light source which by way of a mirror sends visible light through the aperture of the aperture screen or plate in such a way that the illuminated area of the object corresponds to the area thereof irradiated by the X-ray tube during the following X-ray exposure.

The screening or aperture devices previously known have a substantial drawback because of the fact that the illumination of the object has a low intensity when using light sources of a kind usable in practice. Therefore, the illumination in the room where the X-ray photographing is to take place has to be kept so low that the illumination of the object from the screening aperture device is visible. The daylight has too high intensity and therefore it is necessary to darken the room. In operating and sick rooms there is not always any means for darkening the room making a correct adjustment of the X-ray apparatus difficult to provide.

The object of the present invention is to provide a screening or aperture device for an X-ray apparatus making it possible to provide a correct adjustment of the device also by daylight.

In accordance with the invention there is provided a screening or aperture device for an X-ray apparatus comprising curtains displaceable in relation to each other for defining an aperture in order to screen the X-ray beam to a desired irradiation area of the object and a light source adapted to transmit a light beam against the curtains for creating on the object a light pattern visualizing the position of the curtains and thereby of the irradiation area of the object, optical means being connected with the curtains for concentrating the light incident upon the optical means from the light source to a line pattern of high intensity defining the extent of the irradiation area on the object.

A screening or aperture device of this kind provides for the adjustment of the curtains without making it necessary to darken the room.

In an embodiment of the invention the curtains are absorbent to X-ray radiation but transparent to visible light, the curtains themselves having the form of optical lenses constituting the optical means for concentrating the light incident thereupon to said line pattern.

In other embodiments of the invention the optical lenses constituting the optical means of the device consist of separate elements connected with the curtains. In the case that the curtains are transparent to visible light the lenses can be positioned so that the same light rays pass the curtains as well as the lenses. In the case that the curtains consist of a material untransparent or opaque to visible light, the optical lenses can be mounted inside the edges of the curtains defining the aperture.

In the following the invention is described with reference to the accompanying drawings showing different embodiments of the device.

DESCRIPTION OF THE PREFERRED EMBODIMENT

Figure 1:
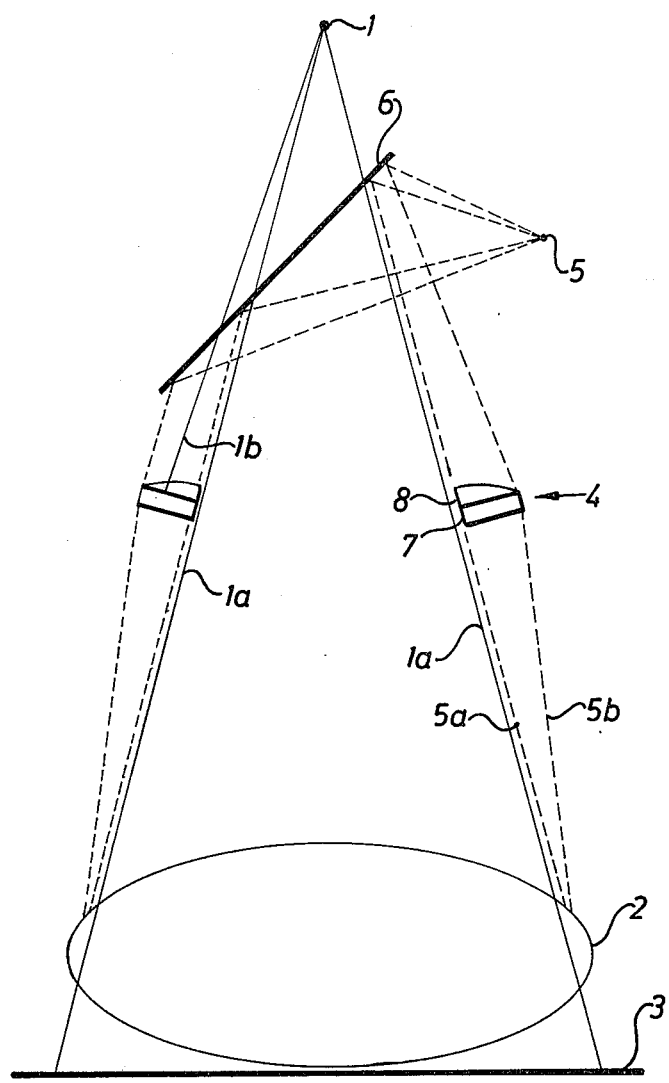
FIG. 1 schematically shows an X-ray apparatus comprising a first embodiment of a device in accordance with the invention.

In FIG. 1 there is shown an X-ray apparatus comprising a screening device in accordance with the invention. The X-ray apparatus comprises an X-ray source 1, e.g. consisting of an X-ray tube, an object 2 which is to be reproduced, a picture recorder medium, 3, e.g. consisting of a film or a picture amplifier sensitive to X-ray radiation, curtains 4 which are elements or plates of X-ray absorbing material for screening or limiting the X-ray beam, a light source 5, e.g. consisting of a bulb, and a mirror 6. The curtains 4 consist of a portion 7 which is X-ray absorbent but transparent to visible light and for example consists of lead glass, and a portion 8 near the aperture defining edges of the curtains or plates consisting of optical elements refracting the visible light. In their most simple embodiment the optical elements consist of semi-cylindrical lenses cut in a plane perpendicular to the main plane and through the optical center.

X-rays 1a passing through the aperture defined by the curtains 4 can pass in the direction of and through the object 2 and thereupon impinge upon the picture recorder medium 3. However, X-rays 1b incident upon the curtains 4 cannot pass therethrough.

The light beam from the bulb 5 can pass through said curtains 4 as these are manufactured from material transparent to visible light. However, the light rays are refracted by the cylinder lenses 8 so that all rays 5b passing outside the optical center are directed against a line on the object substantially corresponding to light rays 5a passing through the optical center in turn exactly corresponding to the position of the most peripheral X-rays 1a which can pass through the aperture defined by the curtains.

Figure 2:
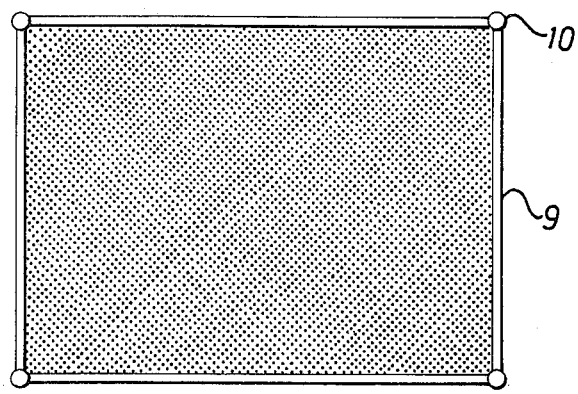
FIG. 2 shows a light pattern created by means of the device according to FIG. 1.

Thus, there is provided on the object lines 9 of high intensity (in reality narrow concentrated light areas) as shown in FIG. 2. At the crossing points between the cylinder lenses there are created bright points 10 further amplifying the optical effect and facilitating the adjustment of the screening or aperture device.

The embodiment of the invention described above is difficult to use in connection with certain devices for contrast equalization. These devices are constituted by elements absorbing the X-ray radiation in different degree within different areas of the object and inversely in relation to the absorption of the object. The contrast equalizing devices are often adjusted by means of optical elements using the light from the bulb 5. However, this requires that the light is not refracted on its way to the contrast equalization device. This type of refraction takes place in the embodiment of the invention described above.

Figure 3A:
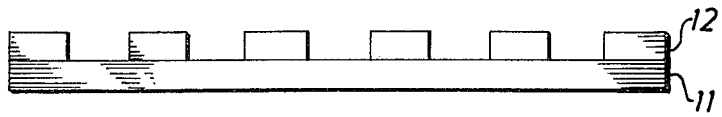
FIGS. 3a, 3b and 3c show an element of another embodiment of the device according to the invention in different directions.
Figure 3C:
Figure 3B:
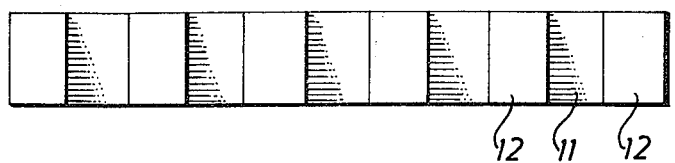

In order to obviate this drawback and make it possible to combine the device in accordance with the invention with contrast equalizing devices the cylinder lenses can be divided into sections as shown in FIG. 3a–3c showing a curtain from three different directions. Each curtain consists of a plane-parallel lead glass plate 11 having several cylinder lens sections 12. Visible light incident upon said cylinder lens sections are refracted whereas light passing between said sections passes straight through the curtains and can be used in a contrast equalizing device for the adjustment thereof.

When using the curtains according to FIG. 3 in a screening device according to the invention the light lines on the object are divided into short line sections corresponding to the cylinder lens sections providing dotted lines. Continuous light lines on the object can be provided by combining the positive cylinder lens elements with negative cylinder lenses having their optical center line positioned perpendicularly to the longitudinal direction of the curtains. Thereby the line sections are elongated so that they constitute a continuous line. The same effect can be provided by giving the positive cylinder lenses a negative spherical component having such a power that the light on the object is distributed to continuous lines. In this connection the power of the positive cylinder lenses should be increased so that there is still obtained an adequate focusing of the light on the object. Thereby, the corners of the irradiation area are diffused.

It is obvious that the curtains can be manufactured in one unit i.e. by being molded from lead glass, so that the elements 7 and 8 of FIG. 1 and 11 and 12 of FIGS. 3a –3c constitute a unitary body.

Figure 4:
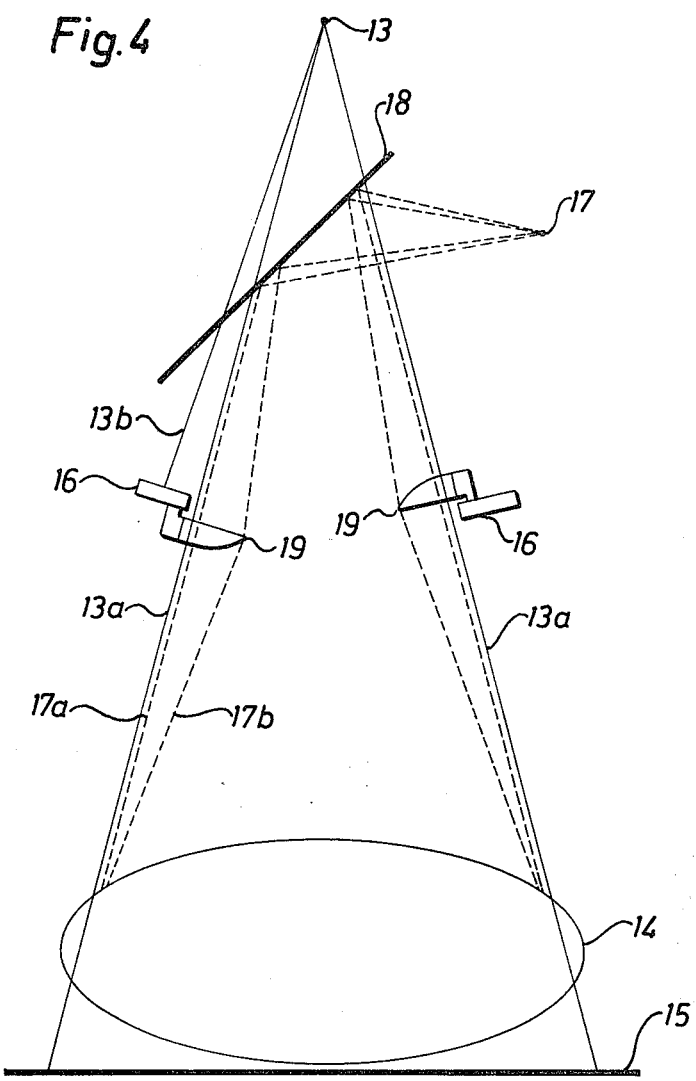
FIG. 4 schematically shows an X-ray apparatus comprising a second embodiment of a device in accordance with the invention.

The X-ray apparatus according to FIG. 4 comprises an X-ray source 13, e.g. consisting of an X-ray tube, an object 14 to be reproduced, a picture recorder medium 15, e.g. consisting of a film or a picture amplifier sensitive to X-ray radiation, curtains 16 for screening the X-ray beam, a light source 17, e.g. consisting of a bulb, and a mirror 18. Optical elements 19 for refracting the visible light transmitted by the bulb 17 are mounted on the curtains 16. Preferably the optical elements consist of semi-cylindrical lenses divided in a plane perpendicular to the main plane and through the optical center. The cylinder lenses are turned so that the optical center is in the plane in which the X-rays pass adjacent the edges of the curtains screening the X-ray beam. X-rays 13a passing through the aperture defined by the curtains 16 can pass in the direction of and through the object 14 and thereupon impinge upon the picture recorder medium 15. X-rays incident upon the curtains 16 can not pass through the curtains.

The sections 17a, 17b of the light beam transmitted from the bulb 17 and passing between the curtains and incident upon the optical elements 19 are refracted and directed against the line of the object corresponding to the most peripheral X-rays 13a passing through the aperture defined by the curtains.

Figure 5:
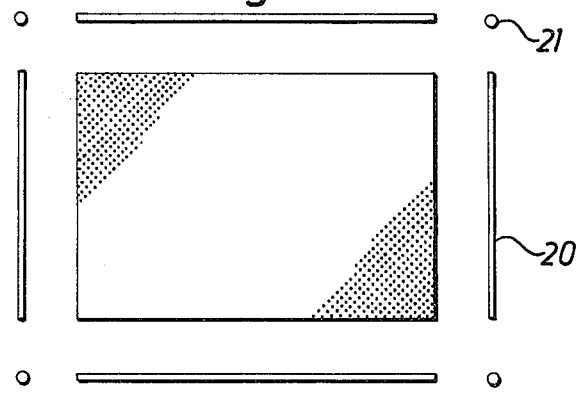
FIG. 5 shows a light pattern created by means of the device according to FIG. 4.

Thus, there are created on the object bright lines 20 (in reality narrow concentrated light areas) as shown in FIG. 5. At the point where the cylinder lenses cross each other, there are created bright points 21 further amplifying the optical effect and facilitating the adjustment of the screening or aperture device. The lines 20 do not extend quite up to the bright points 21 because of the fact that the cylinder lenses shadow at these points.

In order to make it possible to displace the curtains for totally closing the aperture the optical elements 19 are not positioned in the same plane and not in the same plane as the curtains. For example, the optical elements can be mounted as shown in FIG. 4.

The invention can be modified within the scope of the following claims.

We claim:

1. A screening or aperture device for an x-ray apparatus comprising plates of x-ray absorbing material displaceable in relation to each other for defining an aperture in order to limit the x-ray beam to a desired irradiation area of the object and a light source adapted to transmit a light beam against the plates for creating on the object a light pattern visualizing the position of the plates and thereby the irradiation area of the object, wherein optical means are connected with the aperture defining edges of the plates for concentrating the light incident upon the optical means from the light source to a line pattern of high intensity defining the peripheral extent of the irradiation area on the object.

2. A device as claimed in claim 1 in which the plates consist of material transparent to light from said light source and the optical means consists of optical elements so positioned in relation to the plates that the same light rays pass through the optical elements as well as the plates.

3. A device as claimed in claim 2, in which each plate consists of at least one plane-parallel lead glass plate and each optical element consists of at least one semi-cylindrical lens having a main plane surface passing through the geometrical axis of the cylinder, the lens being divided in a plane perpendicular to the main plane and through the optical center, said optical center being positioned at the periphery of the aperture defined by the plates.

4. A device as claimed in claim 2, in which the plates and the optical elements consist of an X-ray absorbing material which is transparent to the light from the light source and is shaped to constitute said optical means.

5. A device as claimed in claim 1, in which the plates consist of material opaque to the light from the light source and the optical means consists of optical elements positioned inside the edges of the plates curtains defining the aperture.

6. A device as claimed in claim 5, in which the optical elements consist of cylindrical lenses mounted with their optical center in the same plane as the X-rays passing adjacent the edges of the plates curtains defining the aperture of the screening device.

7. A device as claimed in claim 2, in which the optical elements are divided into several separate sections with every section lying closely adjacent with the aperture defining edges of the plates.

* * * * *

UNITED STATES PATENT AND TRADEMARK OFFICE
CERTIFICATE OF CORRECTION

PATENT NO. : 3,921,001
DATED : November 18, 1975
INVENTOR(S) : Paul Ragnvald Edholm and Nils Bertil Jacobson It is certified that error appears in the above-identified patent and that said Letters Patent are hereby corrected as shown below:

Col. 4, line 55, (Claim 5) "curtains" should be omitted.

Col. 4, line 60, (Claim 6) "curtains" should be omitted.

Signed and Sealed this second Day of March 1976

[SEAL]

Attest:

RUTH C. MASON
Attesting Officer

C. MARSHALL DANN
Commissioner of Patents and Trademarks